United States Patent [19]

Valadier

[11] Patent Number: 5,754,675
[45] Date of Patent: May 19, 1998

[54] IDENTITY CHECKING SYSTEM HAVING CARD-BEARER BIOMETRICAL FEATURES-STORED IN CODIFIED FORM

[75] Inventor: Jean-Louis Valadier, Marseilles, France

[73] Assignee: Gemplus Card International, Gemenos, France

[21] Appl. No.: 728,666

[22] Filed: Oct. 10, 1996

Related U.S. Application Data

[63] Continuation of Ser. No. 409,310, Mar. 23, 1995, abandoned.

[30] Foreign Application Priority Data

Mar. 23, 1994 [FR] France ............... 94 03433

[51] Int. Cl.$^6$ ..................................... G06K 9/00
[52] U.S. Cl. ....................... 382/115; 235/380; 902/5
[58] Field of Search .................... 382/115, 117–118; 340/825.3, 825.31, 825.32; 235/379, 380, 382; 902/3–5

[56] References Cited

U.S. PATENT DOCUMENTS

| | | | |
|---|---|---|---|
| 4,811,408 | 3/1989 | Goldman | 382/115 |
| 4,849,614 | 7/1989 | Watanabe et al. | 340/825.3 |
| 4,975,969 | 12/1990 | Tal | 382/117 |
| 4,985,920 | 1/1991 | Seki | 380/23 |
| 5,036,461 | 7/1991 | Elliott et al. | 364/408 |
| 5,054,089 | 10/1991 | Uchida et al. | 382/127 |
| 5,073,949 | 12/1991 | Takeda et al. | 382/115 |
| 5,224,173 | 6/1993 | Kuhns et al. | 382/116 |
| 5,228,094 | 7/1993 | Villa | 382/116 |
| 5,229,764 | 7/1993 | Matchett et al. | 340/825.34 |
| 5,280,527 | 1/1994 | Gullman et al. | 380/23 |
| 5,410,642 | 4/1995 | Hakamatsuke et al. | 395/113 |
| 5,422,634 | 6/1995 | Okubo | 340/825.31 |

FOREIGN PATENT DOCUMENTS

| | | |
|---|---|---|
| 0247788 | 12/1987 | European Pat. Off. . |
| 0334616 | 9/1989 | European Pat. Off. . |
| 2173970 | 10/1986 | United Kingdom . |
| WO9311511 | 6/1993 | United Kingdom . |

*Primary Examiner*—Joseph Mancuso
*Assistant Examiner*—Jayanti K. Patel
*Attorney, Agent, or Firm*—Nilles & Nilles SC

[57] ABSTRACT

In a checking system, notably for checking the identity of persons, the person to be checked is the bearer of a chip card containing a limited series of information elements constituting a codified representation of significant morphological characteristics of the card bearer's face. The checking station comprises a card reader for the preparing and presenting, on a screen, of a schematic image of the face on the basis of the codified information elements read in the card. It is then possible to make a comparison between the displayed face and the bearer's face, as well as between the displayed face and the bearer'photograph which may be attached to the card.

18 Claims, 2 Drawing Sheets

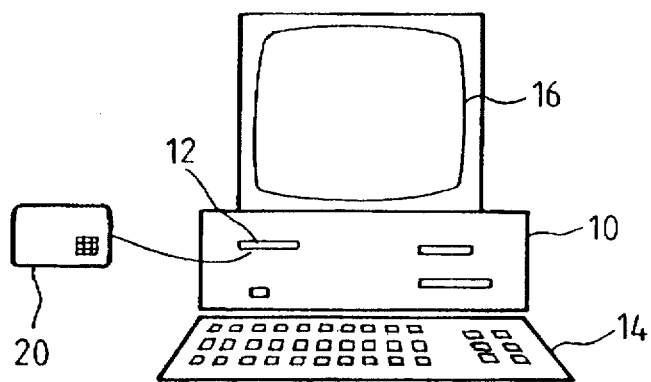
FIG_1
FIG_2

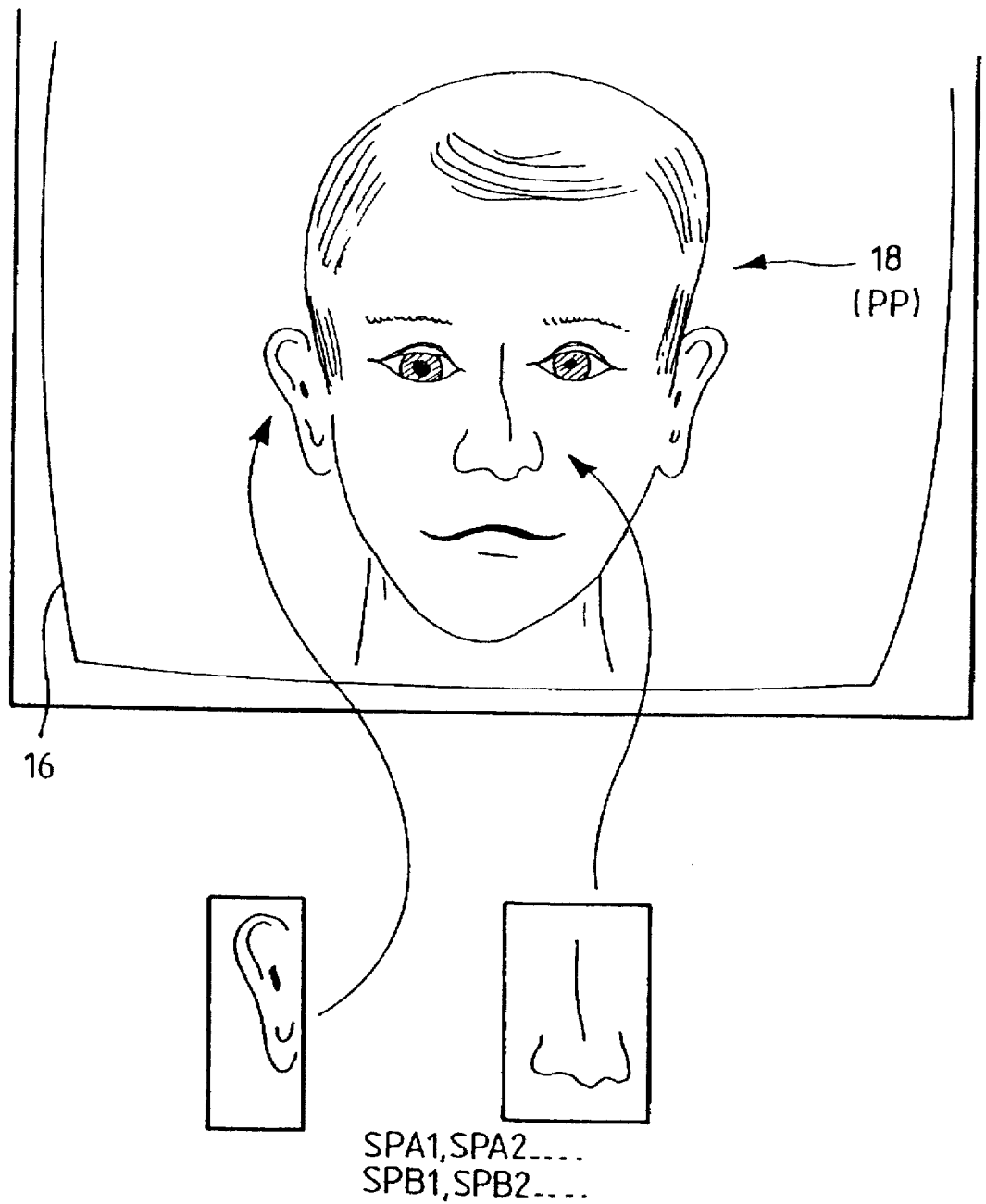
FIG_3

IDENTITY CHECKING SYSTEM HAVING CARD-BEARER BIOMETRICAL FEATURES-STORED IN CODIFIED FORM

This application is a continuation of application Ser. No. 08/409,310 filed Mar. 23, 1995, now abandoned.

BACKGROUND OF THE INVENTION

1. Field of the Invention

The invention relates to systems for the checking and authentication of persons and more particularly to systems relying on the storage of identification data in cards. The bearer carries a card on his person and may present this card to a check post (for example a police station, a border post, etc.) when he has to undergo an identity check.

The identity check consists in ascertaining that the information contained in the card is normal and that the person presenting the card is really the bearer of the card. Conventionally, the card used for these checks is an identity card or a passport. The card number and the other particulars carried on the card can be checked. Furthermore, the bearer's photograph as well as other distinctive signs (eye color, hair color, size, etc.) are indicated on the card. It can be ascertained by a simple visual check that the person presenting the card is truly its bearer.

However, falsification is possible (for example it is possible to fake passports having every semblance of a real passport but using the photograph of a fraudulent individual).

2. Description of the Prior Art

Naturally, attempts have been made to use modern methods to improve security against fraud.

For example, a recently adopted method consists of the electronic printing of a photograph (in facsimile) on the card in such a way that this photo cannot be detached without destroying the card. In most cases, the surface layer of the card consists of a film bearing a hologram thus preventing it from being removed and hence preventing the falsification of the photograph or of the graphic particulars carried by the card.

Attempts have also been made to record identity information so that it is readable not directly on paper but electronically, for example on a magnetic track of the card or in the memory of a chip card.

In a chip card, the security of the information stored in electronic form may be fairly well ensured, especially if it is a microprocessor based card containing safety algorithms. The photograph of the bearer however is needed to ascertain that the person presenting the card is truly the bearer and to check for coherence between the photograph in the chip memory and that on the card. The photograph may be stored in a memory of the chip card if appropriate image compression algorithms are used. This image storage operation however uses a substantial quantity of memory, making the card costly.

Other biometrical information could be used to authenticate a bearer: fingerprints, retinal patterns, etc. The same problem as in the case of photographs generally arises: the biometrical data elements relating to the individual concerned have to be compared with those carried by the card. Now this data could be carried visibly on the card to enable a comparison to be made. Falsification is possible. And if the information is stored in a chip card to make use of the advantages of the security of chip cards, the memory space needed becomes great and hence costly.

The present invention is aimed at proposing a security system that relies on the use of data storage cards and avoids the defects of existing systems.

According to the invention, it is proposed to store a small number of very simple codes in the chip card (equivalent to information ranging from some bytes to some tens of bytes) representing codified biometrical data characteristic of the bearer of the card, checking stations being equipped with means to read these codes and software enabling the provision on a display screen either of an explicit written indication or a visual depiction of the codified biometrical data. The codified data elements are preferably morphological characteristics of the bearer's face.

In the simplest version, the software in the checking station essentially comprises a table for the conversion of the stored codes into explicit literal expressions.

In a particularly original version, which is more sophisticated and may be very worthwhile, the software in the reading station is capable of reading the codes stored in the card and setting up a schematic visual depiction of a theoretical face combining the different morphological characters corresponding to the different codes read in the card.

SUMMARY OF THE INVENTION

In other words, the control system according to the invention therefore comprises at least one chip card designed to be kept by a bearer and a checking station, the chip card comprising a memory to store a small number of very simple codes representing codified biometrical data of the bearer, the checking station having a card reader, a display mean and means to read the simple codes in the card and display an explicit representation of these simple codes on the screen.

The explicit depiction may be an explicit literal expression but a particularly original feature of the invention is the fact that the depiction will preferably be a visual depiction of a schematically represented face having the particular biometrical features corresponding to each of the simple codes read in the card.

The system is particularly suited to the checking of card bearers on the basis of standard biometrical data relating to the face and general morphology of the individual, but it can also be transposed to biometrical data such as fingerprints (encoded by vectors) or retinal patterns (also encoded by vectors).

BRIEF DESCRIPTION OF THE DRAWINGS

Other features and advantages of the invention shall appear from the following detailed description made with reference to the appended figures of which:

FIG. 1 gives a schematic view of the checking system according to the invention;

FIG. 2 gives a schematic view of the general organization of the means used to display an image of a face;

FIG. 3 gives a view on a display screen of a schematic image obtained according to the invention.

MORE DETAILED DESCRIPTION

The invention shall be described with reference to the most promising case which, expressed in a general form, is that of a system comprising at least one data storage card designed to be kept by a bearer and a checking station comprising a card reader, wherein the checking station comprises means to set up and display a schematic image of a part of the card bearer's body on the basis of a limited series of information elements stored in the card and representing, in codified form, a corresponding series of significant morphological characteristics of the part of the bearer's body that is being considered.

The part of the body considered here will be the face, for the face is the part that it is particularly useful to reproduce on a screen when an identity is being checked. However, it will be understood that the invention is not limited to this case since the control methods may rely on other morphologies such as fingerprints or retinal patterns.

The principle of the invention is first of all the storage of a very small quantity of encoded information representing significant morphological characteristics of the individual, for an information element on the existence of one morphological characteristic or another takes up far less space in a memory than a realistic image of this characteristic, or even an explicit literal reference to this characteristic. Now, the card soon becomes costly if it incorporates a large quantity of memory.

Secondly, the idea of the invention is to display a schematic image on the screen reconstituted on the basis of this codified information. Experience with "Identi Kit" photos indeed shows that a schematic image reconstituted from information on general types of morphology has many points of resemblance with the real images of the individuals to whom these morphological types are attributed.

Consequently, the system shall not be limited to the mere display on a screen of a written data element such as "protruding ears" but, a schematic portrait will be drawn showing a face with protruding ears. The visual check will be thereby greatly facilitated and may even make the presence of a photograph on the card unnecessary. If a photograph is still present, the display of the schematic image will in any case make it possible to detect a divergence between the photograph shown and the information stored.

FIG. 1 shows the entire system according to the invention.

The checking station will essentially comprise a personal microcomputer 10 fitted out with a chip card reader 12, a keyboard 14 and a display screen 16. The microcomputer is provided furthermore with the necessary means (hard disk, floppy diskettes, etc.) enabling the storage and execution of the software needed to implement the invention.

The system is designed for the checking of persons holding a chip card 20. The card 20 may contain a variety of information elements and, according to the invention, it also contains the series of simple codes defining the morphology of the bearer's face.

The morphology may be defined by several morphological elements (for example: shape of the face, shape of the eyes, color of the eyes, etc.) and to each of these elements it is possible to assign one codified value among several values representing different possibilities. For example, for the morphological element A which may be the shape of the face, it is possible to provide for values 1 ("round"), or 2 ("oval"), or 3 ("square"), etc. Similarly the same could be done for the other morphological elements such as B: shape of the eyes, or C: shape of the ears, etc.

The card may store the codes (A, B, C, ...) representing the morphological elements with codes (1, 2, 3, ...) representing their value. For example, the card contains a series of pairs of codes. The first code of a pair represents a morphological element and the second code of the pair represents a value assigned to this code for the individual considered.

However, it is also possible, in order to limit the memory space taken up in the card, to envisage a case where only the values are stored and not the codes of morphological elements. The position of a value in a series of successive values represents the morphological element to which this value is assigned. The different positions of values are predetermined and correspond to the different morphological elements that have to be stored in a well-defined order. The checking station knows the order of the values recorded in the card and may reconstitute a table of morphological elements by using their codified values read in the card at predetermined positions of a memory.

FIG. 2 shows the general organization of the means (essentially software means) that enable the use of the encoded values read in the card.

The software of the checking station is first of all capable of setting up a table T of morphological characteristics with codified values.

With each value (1, 2, 3, ... ) of a codified element (A, B, C, ... ) there is associated a subprogram for the drawing of a schematic shape representing this element (SPA1, SPA2, ... , SPB1, SPB2, ... ). The drawing subprograms enable the preparation of a part of the image of the face with a view to its display on the screen 16. The control software (main program PP) associates the elements of drawings with one another to arrive at a general image 18 (FIGS. 2 and 3) of the face, schematically depicted in the sense that it results from codified characteristics but may have a realistic appearance (if the drawing subprograms themselves use prerecorded images that are sufficiently realistic).

The main program PP of the checking station will therefore first of all make a reading in the card to set up a table of codified morphological values and then, for each codified value, it searches for a corresponding drawing program and associates the different subprograms with one another to display a total image of the face. The prepared image 18 possesses the morphological characteristics corresponding to those recorded in the card.

It is easy for presently existing drawing software, working on the basis of schematic or realistic images, to enlarge, reduce, shift or rotate these images so that it is possible to associate several elements of realistic appearance to arrive at a complex image that represents a face coherently.

For example, it may be provided that the subprogram for drawing the shape of the face comprises not only elements to prepare an image of schematic appearance (that is more or less realistic) on the screen, having the general shape corresponding to the value assigned (round, oval, pear-shaped, etc.) but also reference points to place the other morphological elements of the face: reference point relating to a position of the nose, eyes, ears or mouth, etc.

The other subprograms too have the elements needed for a varyingly realistic schematic drawing of a morphological shape as well as reference marks that may enable association with other elements. For example, a subprogram corresponding to the "protruding ears" value assigned to the "ear shape" comprises firstly the drawing of the protruding ears and, secondly, positional references in this drawing, making it possible to place this drawing automatically on the "shape of the face" drawing by making the reference points of the drawing of the ears correspond with the references points planned on the drawing of the face.

It is therefore easy to show a complete image of the face, integrating the different codified morphological characteristics read in the card.

FIG. 3 gives a schematic view of the way in which a total image 18 can be made on the screen 16 on the basis of elements of drawings prepared by the subprograms SPA1, etc. The overall synthesis is done by the main program PP.

For certain morphological characteristics, the imaged representation will consist of a modification of the drawing already displayed by a previous characteristic. For example, the "almond eyes" characteristic may have given rise to a first drawing subprogram and the "close-set eyes" characteristic may lead to a shifting of the drawing elements corresponding to the eyes. Similarly, the value "blue eyes" assigned to the "eye color" element will imply a color filling-in (on a color screen) or a slightly gray filling-in (black and white screen) of the iris of the drawing done by other subprograms.

Naturally, the variable degree of sophistication of the schematic representation of the card-bearer's face will depend on the software processing capacities of the checking station and on the cost accepted for the installed processing software.

It may be desirable to prevent the schematic representation of the face from being of an excessively realistic type. A portrait such as an "IdentiKit" portrait, markedly having the appearance of a hand drawing, may be preferable to a portrait that appears too much like a realistic photograph. (As is known, identikits are used, e.g., by police stations to assemble a portrait of an individual using standardized variations of facial features that come with the kit.) However, the choice between these two types of representation depends on the applications envisaged.

By way of an indication, various morphological elements that could be used to fill the chip card are given here below:

A: shape of the face
B: shape of the eyes
C: shape of the ears
D: shape of the nose
E: shape of the hair
F: shape of the eyebrows
G: shape of the forehead
H: shape of the mouth
I: shape of the chin
J: face color
K: eye color
L: hair color
M: glasses
N: moustache
O: beard.

Each of these elements may have a value, for example a value ranging from 1 to 9. The value 0 may correspond to a default value when there is no particular information.

Thus, a precise morphological description is obtained with a few bytes (if it is not the codes of the morphological elements but only their values that are stored, then the number of bytes are particularly small). There is a very large number of combinations enabling a good description of an individual. The depiction on a screen enables the reproduced image to be compared with the face of the bearer presenting the card. It also enables a comparison of the image displayed on the screen with the bearer's photograph (when the photograph is on the card) to detect any divergence between the indications of the card and the photograph attached to the card.

The checking station may furthermore make a display, on the screen, without representing it by a drawing, of additional information read in the card: for example the height of the bearer, his build, etc.

The card may be provided with varying degrees of security, i.e. its use may be subject to the prior entry, through the keyboard, of a confidential access code. Furthermore, in an even more secured version, exchanges between the card and the exterior are encrypted making it impossible to read the information contained in the card directly. For these cases, the card is a microprocessor based card and not a simple memory card.

What is claimed is:

1. A checking system comprising:
   a chip card for possession by a bearer, the chip card further comprising a chip card memory, the chip card memory having stored therein a small number of very simple codes representing biometrical feature data pertaining to features of the bearer, each feature being attributed a value, the value representing one of a limited number of different morphological possibilities for the feature, the value being further biometrically codified into a code which is an arbitrarily chosen binary representation of the value, the code thereby being one of the small number of very simple codes which is stored in the chip card memory, and the chip card memory storing exactly one code per feature, and
   a checking station comprising
      a card reader for reading the small number of very simple codes stored in the chip card memory,
      a visual comparison device, the visual comparison device being formed of a display for displaying a composite representation of the bearer's schematically drawn morphological features, the displayed composite representation being assembled based upon the small number of very simple codes stored in the chip card memory and read by the card reader, and the visual comparison device enabling a human operator to perform a visual comparison of (1) the displayed composite representation of the bearer's morphological features with (2) the bearer's actual morphological features.

2. A checking system according to claim 1, wherein the displayed composite representation is a representation of a face having the features corresponding to the small number of very simple codes stored in the chip card memory.

3. A checking system according to claim 1, wherein the bearer's actual morphological features are illustrated in a photograph of the bearer, and wherein a face of the card has the bearer's photograph attached thereto such that (1) the photograph containing the bearer's actual morphological features and (2) the displayed composite representation are simultaneously viewable in the presence of the bearer.

4. A checking system according to claim 1, wherein the number of different morphological possibilities is limited to about ten possibilities, and wherein each of the codes is limited to about four bits.

5. A chip card for possession of a bearer and for use in conjunction with a visual comparison device, the visual comparison device being adapted for displaying a composite representation of the bearer's schematically drawn morphological features thereby enabling a human operator to perform a visual comparison of (1) the displayed composite representation of the bearer's schematically drawn morphological features with (2) the bearer's actual morphological features, the chip card comprising:
   a connection device, the connection device being adapted for connecting the chip card to the visual comparison device, and
   a chip card memory, the chip card memory being coupled to the connection device, the chip card memory storing a small number of very simple codes representing biometrical feature data pertaining to features of the bearer, each feature being attributed a value, the value representing one of a limited number of different morphological possibilities for the feature, the value being further biometrically codified into a code which is an arbitrarily chosen binary representation of the value, the code thereby being one of the small number of very simple codes which is stored in the chip card memory, and the chip card memory storing exactly one code per feature, and wherein the composite representation displayed by the visual comparison device is assembled based upon the small number of very simple codes stored in the chip card memory.

6. A chip card according to claim 5, wherein the number of different morphological possibilities is limited to about ten possibilities, and wherein each of the codes is limited to about four bits.

7. A chip card according to claim 5, wherein said composite representation is a representation of a face having features corresponding to each of the codes stored in the card.

8. A chip card according to claim 7, wherein the bearer's actual morphological features are illustrated in a photograph of the bearer, and wherein the bearer's photograph is present on a face of the chip card so that (1) the photograph containing the bearer's actual morphological features and (2) the displayed composite representation of the bearer are simultaneously viewable.

9. A chip card according to claim 7, wherein the features include at least two of the bearer's shape of the face, shape of the eyes, shape of the ears, shape of the nose, shape of the hair, shape of the eyebrows, shape of the forehead, shape of the mouth, shape of the chin, face color, eye color, hair color, glasses, moustache, and beard.

10. A chip card according to claim 5, wherein the bearer's actual morphological features are illustrated in a photograph of the bearer, and wherein the bearer's photograph is present on a face of the chip card so that (1) the photograph containing the bearer's actual morphological features and (2) the displayed composite representation of the bearer are simultaneously viewable.

11. A chip card according to claim 5, wherein the features include at least two of the bearer's shape of the face, shape of the eyes, shape of the ears, shape of the nose, shape of the hair, shape of the eyebrows, shape of the forehead, shape of the mouth, shape of the chin, face color, eye color, hair color, glasses, moustache, and beard.

12. A method of checking the identity of an individual using a chip card, the method comprising the steps of (A) storing identification data in the chip card on a feature-by-feature basis, the storing step including the steps of
examining a morphological feature of the individual,
setting a value for the morphological feature, the value being one of a limited number of possible values for the morphological feature, wherein the number of different morphological possibilities for each feature is limited to about ten possibilities,
biometrically codifying the value into a code, the biometrically codifying step including the step of storing the code in the chip card, the code forming the identification data, and
repeating the examining, setting and codifying steps for a small number of morphological features wherein for each feature only one code is stored, and wherein the one code for each feature is limited to about four bits, such that a small number of very simple codes are stored relating to the morphological features of the individual; and (B) checking the identity of the individual, the checking step including the steps of
retrieving and decodifying the stored codes,
assembling a composite representation of the plurality of schematically drawn morphological features of the individual, the composite representation being assembled on a feature-by-feature basis based upon the small number of very simple codes,
displaying the composite representation of the plurality of schematically drawn morphological features of the individual, the composite representation being displayed to a human operator, and
visually comparing (1) the composite representation of the plurality of schematically drawn morphological features with (2) the actual morphological features of the individual the visually comparing step being performed by the human operator.

13. A method according to claim 12, wherein the composite representation of the plurality of morphological features is displayed in the form of a portrait.

14. A method according to claim 12, wherein the plurality of morphological features are one of facial features, fingerprint patterns and retinal patterns.

15. A method according to claim 12, wherein during the storing steps, the codes are stored in encrypted fashion, and wherein the checking step further comprises the step of decrypting the codes.

16. A method according to claim 12, wherein during the comparing step, the actual morphological features of the individual are displayed by one of (1) the presence of the individual and (2) an illustration of the actual morphological features in a portrait of the individual attached to a face of the card.

17. A method according to claim 12, wherein a portrait of the individual is attached to a face of the chip card.

18. A method according to claim 12, wherein plurality of morphological features include at least two of the bearer's shape of the face, shape of the eyes, shape of the ears, shape of the nose, shape of the hair, shape of the eyebrows, shape of the forehead, shape of the mouth, shape of the chin, face color, eye color, hair color, glasses, moustache, and beard.

* * * * *